Figure 1:
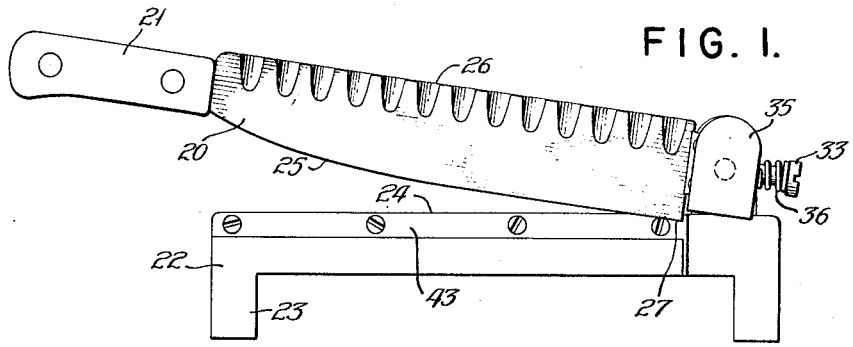

Oct. 24, 1950     J. LUZZI     2,527,018

CUTTING IMPLEMENT

Filed June 18, 1947

INVENTOR
James Luzzi
BY
Blair, Curtis & Hayward
ATTORNEY

Patented Oct. 24, 1950

2,527,018

UNITED STATES PATENT OFFICE 2,527,018

CUTTING IMPLEMENT

James Luzzi, Greenwich, Conn.

Application June 18, 1947, Serial No. 755,350

4 Claims. (Cl. 146—146)

The present invention relates to cutting implements. One object thereof has been to provide a blade having a cutting edge of known or usual character and a second cutting edge adapted to produce slices or portions of cut off material having wavy or other irregular surface contours. A further object has been to provide a blade more particularly adapted to cut viscous or sticky substances, such as cheese and certain vegetables and separate the cut off portions thereof with greater facility than is possible in using slicing blades of known constructions. A further object has been to provide a shearing and chopping device comprising a blade and a block and wherein the blade has cutting edges of different characteristics and is adjustably mounted so that, in one position, one cutting edge thereof operates in shearing relation to one portion of the block and, in reversed position, the other cutting edge thereof operates in chopping relation to another portion of the block, thus conveniently combining slicing, shearing and chopping in a single device. Further objects will be in part pointed out as the description proceeds and will in part become apparent therefrom.

In the accompanying drawings, I have shown a preferred embodiment of my invention and modifications thereof described in this specification. It is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

Figure 2:
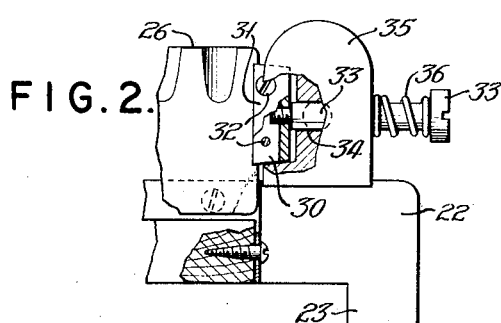
Figure 7:
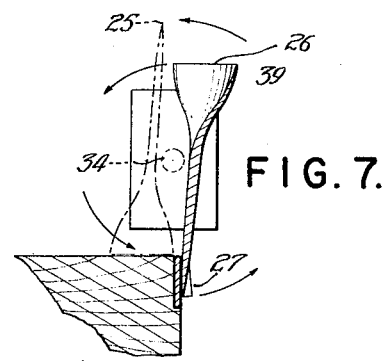
Figure 6:
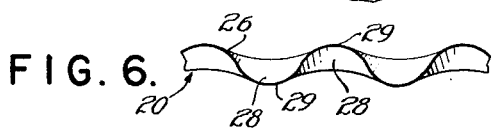
Figure 3:
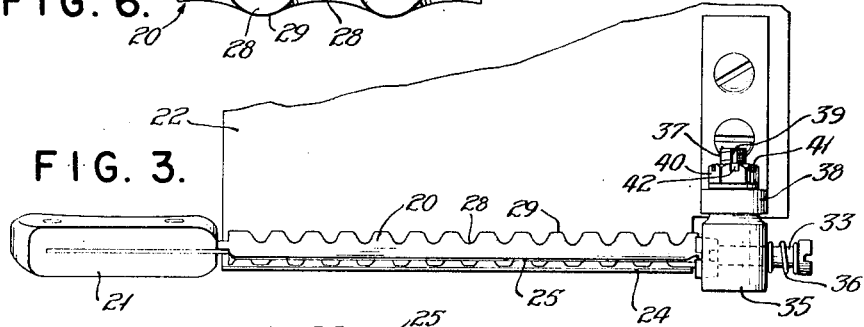
Figures 4, 5:
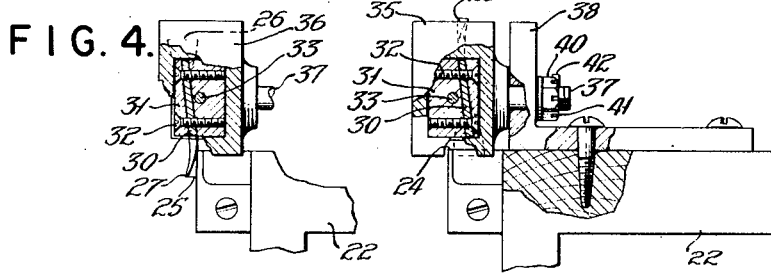
Figure 8:
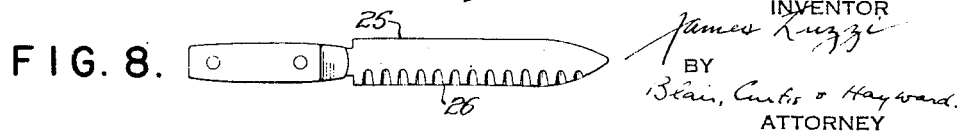

In said drawings, wherein like reference characters refer to similar parts:

Figure 1 is a side elevation of a combined shearing and chopping device with the blade in shearing position;

Figure 2, a fragmentary view on enlarged scale and in side elevation of an end portion thereof and with parts broken away to reveal details of construction;

Figure 3, a top plan view of the device shown in Figure 1, but with the blade in reversed or chopping position;

Figure 4, a fragmentary view in end elevation with parts broken away and parts of the knife blade mounting shown in transverse vertical section, the knife being in shearing relation to the cutting block edge as in Figure 1;

Figure 5, a fragmentary view in end elevation with parts broken away and parts of the knife blade mounting shown in transverse vertical section, the knife being in chopping position, as in Figure 3;

Figure 6, a fragmentary plan view of a knife provided with a modified form of chopping edge;

Figure 7, a view in transverse vertical section illustrating the relative positions of the parts when the knife is in shearing position (full lines) and in chopping position (dotted lines); and Figure 8, a side elevation of one form of kitchen knife usable independently of the block and mounting devices shown in Figures 1 and 3.

In Figures 1 through 5, and 7, I have shown a combined shearing or slicing and chopping device wherein a blade 20 having a handle 21 is pivotally mounted at one end in operative relation to a base block 22, having supporting legs 23 of height sufficient to allow a plate or shallow dish to be inserted under the cutting edge 24 of the block.

Blade 20, as appears more clearly in Figures 1 and 7, includes a shearing edge 25, which may be of any desired vertical contour, as curved, Figure 1, or straight, Figure 8, in the sense that the sharp edge of an ordinary flat kitchen knife is straight. Stated another way, the shearing edge 25 lies substantially in the longitudinal median plane of the blade 20, or is the intersection between the relatively flat side surface portions of the blade. One feature of my invention is that the blade 20 is not vertically positioned, but is canted so that the vertical line through the shearing edge 25 at any point clears that portion of the blade which passes below the cutting edge 24 of block 22. This canting, as set forth below, is also such that the back or chopping edge 26 of the blade is in effective position to engage a portion of the top face of the block 22 when the blade is reversed. The corner 27 of the shearing edge 25 is bent slightly outward, as shown, to assure its passing the cutting edge 24 of block 22.

As shown in Figure 6, blade 20 also has opposite the shearing edge 25, the zig-zag or waveform chopping edge 26 for "waffling" and similar special form producing operations. The blade adjacent this chopping edge is fluted or grooved transversely of the blade to give it a corrugated contour with respect to its longitudinal median plane, or, more generally, the transverse contour of the blade is irregular, i. e., varies in different sections. Thus, blade 20 is of a generally wedge shaped cross section, being wider at its corrugated chopping edge 26 and tapering to the sharp shearing edge 25, so that its side surfaces are in part corrugate in form and of diminishing depth from the edge 26 toward the edge 25.

The opposed side faces of blade 20 as shown, Figure 6, present re-entrant portions 28 and convex portions 29, each re-entrant portion alternating with a convex portion, said portions tapering or diminishing in depth from the edge 26 toward the edge 25. This arrangement produces in the side faces of the blade channels such that when the blade is used to cut viscous or sticky substances such as cheese, potted meats and certain vegetables, or the like, the adhesion to the blade is broken gradually as the material slides up the side of the blade and air admitted through the channels allows the material to fall away from the blade without breaking. The flare of the convex or protuberant portions of the side surfaces tends to force the sliced material outwardly and away from the mid-portion of the blade, while the re-entrant portions admit air between the blade and the substance being sliced. This reduces the tendency of the substance to adhere to the blade surfaces and thus facilitates cutting and separation of the slices. Conversely, when slicing or chopping with the corrugate edge, the flat sided portion of the blade gradually breaks the surface adhesion of the sliced material, and allows air to enter through the grooves in the slices to free them from the blade. These advantages in use obtain whether the blade be in the form shown in Figure 8 or in combination with a base block, as shown in Figures 1, 4 and 5.

Referring now to Figures 2, 3 and 4, one end of blade 20 is provided with a butt 30 secured to a tapered block 31, Figure 2, e. g., by screws 32. Said block 31 has a threaded recess to receive the threaded inner end of a bolt 33 which slides endwise and is rotatable in a hole 34 extending longitudinally through a portion of fitting 35. Block 31 is slidably movable into and out of a tapered recess in said fitting 35 where it is normally held seated by a spring 36. As shown in Figure 3, a lug 37 extending from fitting 35 has its axis perpendicular to and intersecting the axis of said bolt 33 and of handle 21, and is journaled in a bracket 38 with its longitudinal slot 39 exposed. A nut 40 threaded on said slotted end of lug 37 and bearing against a portion of bracket 38 is provided with radial slots 41 cooperating with a detent 42 slidably mounted in slot 39 to hold said nut 40 against rotation.

With the blade adjusted as shown in Figures 1 and 2, the shearing edge 25 of blade 20 slides downwardly in shearing or slicing relation to a steel strip 43 set in the upper edge of one face of base block 22 and which provides the cutting edge 24 previously referred to. Blade 20 is releasably held in this position in fitting 35 by spring 36 interposed between said fitting 35 and the flanged head of bolt 33.

To reverse blade 20, i. e., to adjust it from shearing to the chopping position shown in Figures 3 and 5, the operator pulls blade 20 rearwardly, i. e., toward the left, Figure 1, compressing spring 36 until block 31 clears the tapered recess of fitting 35. By rotating the blade 20 and block 31 through 180° and allowing the spring 36 to reseat block 31 in said recess, blade 20 takes the chopping position shown in Figures 3 and 5. When the free end of blade 20 is now swung downwardly, with stud 37 pivoting in the bearing of bracket 38, said undulate edge 26 of the blade comes into engagement with a portion of the top surface of base block 22 beyond the inner side of face plate 43. Where the base block is of wood or other suitable material it provides in effect a kind of chopping block. Thus, if a strip or piece of material, as bread, cheese, vegetable, etc., is placed on said block with a portion in the path of movement of said undulate edge, as in Figure 3, said material will be severed along an undulating line of wavy, scalloped or similar contour, depending on the shape of the chopping edge 26.

It will be understood that the device of Figures 1 through 7 has advantages which can be attained even when both edges of the blade are straight, and even if the shearing edge 25 is blunt, as in an ordinary shear, instead of a knife edge as shown.

As various embodiments may be made of the above invention and as changes might be made in the embodiments above set forth, it is to be understood that all matter hereinbefore set forth or shown in the accompanying drawing is to be interpreted as illustrative and not in a limiting sense.

I claim:

1. In a cutting device the combination of a block, a blade holder eccentrically pivoted thereto and a blade provided with opposed longitudinal edge portions which differ one from the other in respect to their cutting characteristics, said holder having a socket of varying diameter and having inverse symmetry with respect to an axial plane approximately perpendicular to the plane of the base of said block and said blade having a butt of the same form releasably engaged in said socket, and spring means engaging between the holder and the blade and urging the butt of the latter in to said engagement with the socket of the holder.

2. A cutting device comprising a block having a shearing edge and a chopping surface adjacent thereto, a blade holder pivotally mounted on said block on an axis transverse to said shearing edge and having a fitting thereon of varying radius, whereby to secure a blade against rotation therein, but with angular symmetry of lateral halves, about an axis above the level of said chopping surface, a distance less than half the width of the blade whereby said blade is locked alternatively in either of two different rotational positions, a blade provided with a knife edge which is in shearing relation to said shearing edge of the block in one of said positions and opposite the knife edge a different cutting edge, a fitting on one end of said blade fitted to said fitting on the blade holder with its axis of symmetry displaced from the different cutting edge of the blade by a distance equal to the distance which said axis of symmetry is above the level of the chopping surface and displaced substantially beyond one side of said blade which contacts the shearing edge whereby to position said knife edge of the blade against said shearing edge of the block when it is in one position in said holder and to position said cutting edge of the blade over the chopping surface of the block when it is in another position in said holder, and a yieldable retainer holding said fittings releasably in operative engagement.

3. A cutting device comprising a block having a shearing edge and a chopping surface adjacent thereto, a blade holder pivotally mounted on said block on an axis transverse to said shearing edge and having a fitting thereon of varying radius whereby to secure a blade against rotation therein, but with angular symmetry of lateral halves, about an axis above the level of said chopping surface, a distance less than half the width of the blade whereby said blade is locked alternatively in either of two different rotational positions, a blade provided with a knife edge which is in shearing relation to said shearing edge of the block in one of said positions and opposite the knife edge a different cutting edge, a fitting on one end of said blade fitted to said fitting on the blade holder with its axis of symmetry displaced from the different cutting edge of the blade by a distance equal to the distance which said axis of symmetry is above the level of the chopping surface and displaced substantially beyond one side of said blade and the fitting being canted with respect to the blade which contacts the shearing edge, whereby to position said knife edge of the blade against said shearing edge of the block when it is in one position in said holder and to position said cutting edge of the blade over the chopping surface of the block when it is in another position in said holder, and a yieldable retainer holding said fittings releasably in operative engagement.

4. A domestic slicing knife including coaxial blade and handle portions, said blade portion embodying a pair of sharp cutting edges extending from end to end along its side margins, said cutting edges defining substantially straight parallel lines throughout the major portion of the blade length as viewed in knife profile taken perpendicular to the plane of the blade portion, whereby either edge may cut throughout its length against a substantially flat block, one of said edges and the adjacent regions of said blade portion being substantially flat in edge view, the other of said edges and the adjacent regions of said blade portion being of zig-zag configuration in edge view with corrugations tapering into and blending with said flat regions, said flat regions being a little wider as measured across the blade than the corrugated regions of said blade, whereby flat slices cut by said one edge are cammed outward and released from surface-adhesive contact with said blade portion by admission of air along the corrugated regions adjacent said other edge and whereby zig-zag slices cut by said other edge are cammed out of surface-conforming contact with said blade portion by the flat regions adjacent said one edge, and both of said edges being free from obstructions whereby slices may be cut thereby broader than the blade width.

JAMES LUZZI.

REFERENCES CITED

The following references are of record in the file of this patent:

UNITED STATES PATENTS

| Number | Name | Date |
| --- | --- | --- |
| D. 56,562 | Lickert | Nov. 9, 1920 |
| 139,373 | Deane | May 27, 1873 |
| 181,918 | Cushing | Sept. 5, 1876 |
| 1,271,665 | Caron | July 9, 1918 |